Feb. 11, 1930.  B. J. BABBITT  1,746,627
METHOD OF AND APPARATUS FOR DETECTING SLIGHT VARIATIONS IN A FORCE
Filed Dec. 14, 1927  3 Sheets-Sheet 1

Inventor:
Bethel J. Babbitt.

Feb. 11, 1930.  B. J. BABBITT  1,746,627
METHOD OF AND APPARATUS FOR DETECTING SLIGHT VARIATIONS IN A FORCE
Filed Dec. 14, 1927    3 Sheets-Sheet 2

Inventor:
Bethel J. Babbitt

Inventor:
Bethel J. Babbitt.
Attys.

Patented Feb. 11, 1930

1,746,627

UNITED STATES PATENT OFFICE

BETHEL J. BABBITT, OF RIVERSIDE, ILLINOIS

METHOD OF AND APPARATUS FOR DETECTING SLIGHT VARIATIONS IN A FORCE

Application filed December 14, 1927. Serial No. 239,960.

This invention relates to a device for detecting slight changes or variations in a force which is nearly constant. It may, for example, be used to detect differences in the acceleration of gravity in different localities, to investigate the magnetic properties of liquids or gases, or to test the permanency of magnets. It is an object of the invention to provide apparatus which is not only highly sensitive to small variations of a force, but of which the degree of sensitivity can readily be controlled. To this end, a movable member is supported in such a way as to be acted on by opposed forces, such as gravity and a magnetic field, so that the member is held in a position of stable equilibrium. The magnetic field, however, is so arranged that the stability of the equilibrium of the movable member is regulable and may be made very small. This results in a high degree of sensitivity of the apparatus as is hereinafter explained so that by maintaining in the apparatus a constant magnetic field, slight changes in the pull of gravity on the movable member may be observed. Conversely, by maintaining the apparatus at a point of constant gravitational pull, variations in the upward component of the magnetic field may be observed. Thus in the former case, the apparatus may be transported from place to place and is available to detect the presence of subterranean bodies of material of abnormally high density such as ore deposits, or of abnormally low density such as oil deposits. Or, in the latter case, it may be immersed successively in different fluids, and the results of the immersions on the magnetic field noted. Various advantageous features of construction and arrangement of the parts of the apparatus will be apparent to one skilled in the art from the disclosure of the invention in the following description and on the drawings, of which,—

Figure 1:
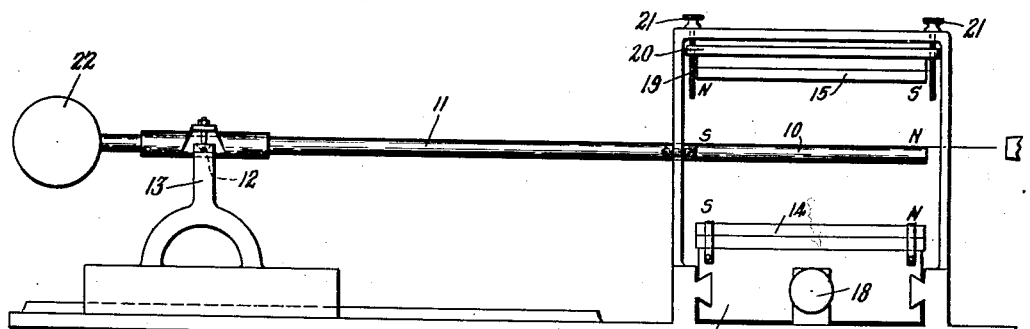
Figure 1 is a side elevation of one embodiment of my invention.
Figure 5:
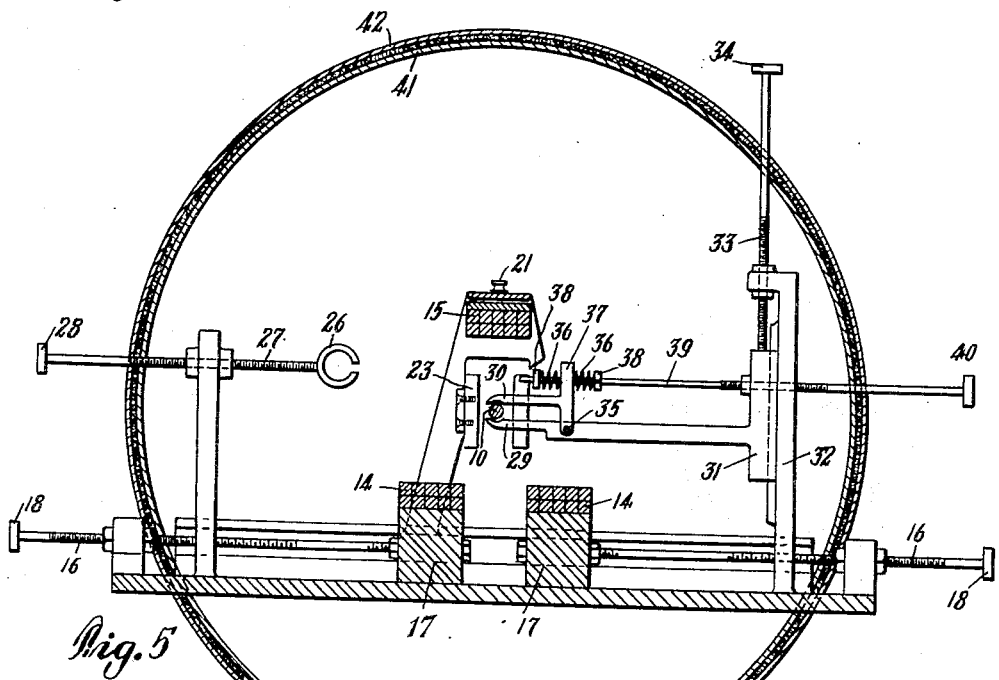
Figure 5 is a section on the line 5—5 of the apparatus shown in Figure 4, a shield also being shown in section.
Figure 7:
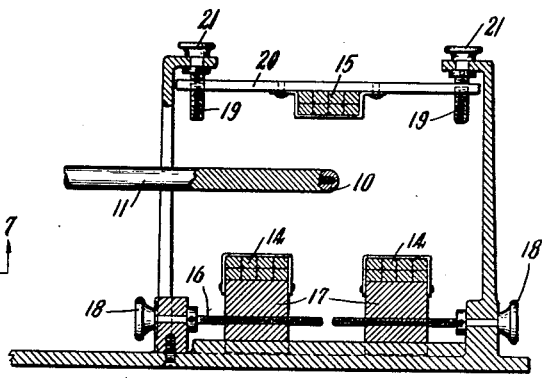
Figure 7 is a section on the line 7—7 of Figure 6.

Referring to the drawings in detail, 10 represents a permanent magnet. As shown in the apparatus illustrated on the drawings, this magnet is supported at the end of a relatively long arm 11 which is preferably of aluminum or other light material, the arm and magnet being pivotally supported as by knife edges 12 resting on suitable bearings in a support 13. The knife edges 12 are so arranged that the magnet 10 is permitted substantially free vertical motion through a limited range. In order to oppose the pull of gravity on the magnet 10, I provide a number of stationary magnets which may be arranged as shown in Figures 5 or 7, two of the magnets 14 being located below the floating magnet 10 and spaced on either side of the vertical plane of motion of the latter. Directly above the floating magnet 10 may be mounted a fixed magnet 15. As indicated in Figure 1, the poles of the stationary magnets are so arranged that the lower magnets repel the floating magnet 10 while the upper magnet 15 attracts the floating magnet. Essentially, the method consists in adjusting the stationary magnets with reference to each other in such a way that the resultant magnetic field will exert an upward force on the magnet 10 which is equal and opposite to the gravitational pull at some point approximately midway between the upper and lower magnets and which passes through a minimum value near this point if the magnet 10 be moved vertically through its entire range of motion between the upper and lower magnets. When the magnet 10 is located at such a point of equilibrium, a slight change of gravitational pull will shift the point of equilibrium and with it the magnet 10, the displacement of the latter being observed. As will be more fully described hereinafter, a very sensitive adjustment can thus be made whereby after balancing the magnet 10 in a position of equilibrium, a very slight change in the gravitational pull thereon will result in a considerable displacement of the magnet sufficient for observation. The magnets themselves are preferably made of the most stable grade of cobalt steel in order to insure constancy of the magnetic fields in the apparatus. The stationary magnets are also preferably composed of bundles of magnetized needles or small bar magnets which permit relatively great pole strength with relatively small bulk. The lower magnets 14 may be adjustable laterally by screws 16 which pass through the base blocks 17 which support magnets 14, the screws 16 being rotatable as by knurled heads 18 to permit fine adjustment of the magnets. The upper stationary magnet 15 is also preferably adjustable vertically as by screws 19 which are threaded through the support 20 which carries the magnet 15. The screws 19 may be rotated as by knurled heads 21. If desired, the pull of gravity on the magnet 10 may be partly counterbalanced as by a weight 22 mounted on the further end of the arm 11 beyond the fulcrum 12. This permits greater spacing between the floating magnet 10 and the stationary magnets 14 and 15. In order to damp the vibrations of the floating magnet 10, I may place adjacent to the poles thereof blocks of copper 23, these blocks being of any desired size and shape. As illustrated on the drawings, they may conveniently be about half the length of the magnet 10 and may be positioned on either side of each pole thereof. Any motion on the part of the magnet 10 will set up eddy currents in the copper blocks 23 which will oppose the motion in a manner well known in the art. In order to facilitate the observation of slight displacements of the magnet 10 due to very small differences of gravitational or other forces which are to be detected, I may mount on the ends of the magnet 10 a short length of quartz or glass fiber 24, the end of which may be in the field of a suitable microscope 25. Instead of the fiber and microscope, I may use any other means for detecting small motion such, for example, as an interferometer, a system of mirrors or a system employing a combination of mechanical, optical and electrical amplifications, or any other desired system.

Figure 2:
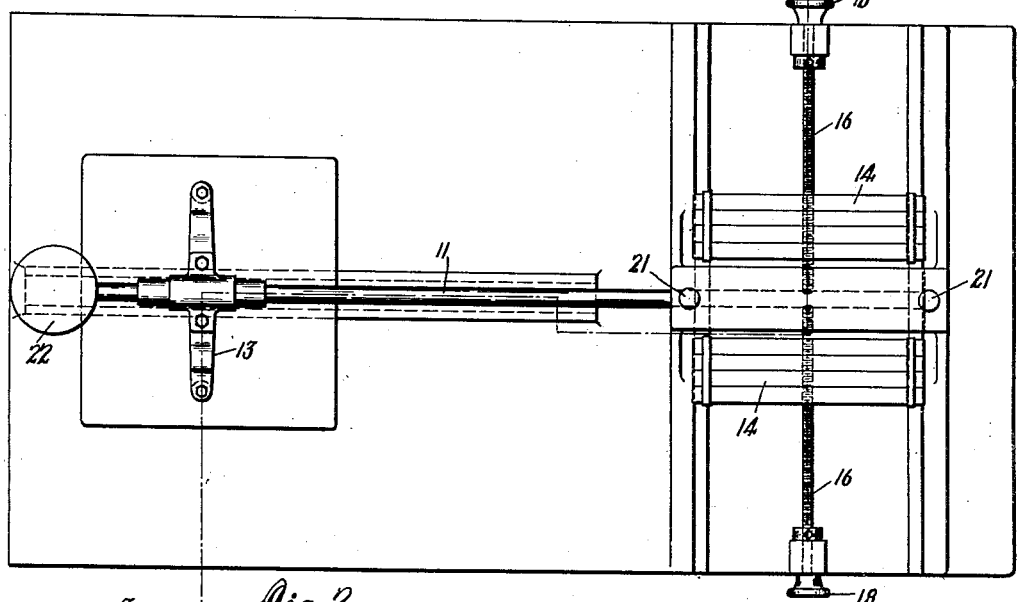
Figure 2 is a plan view of the same.
Figure 3:
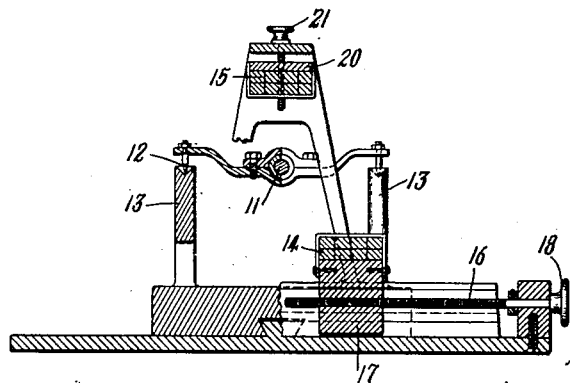
Figure 3 is a section on the line 3—3 of Figure 2.
Figure 4:
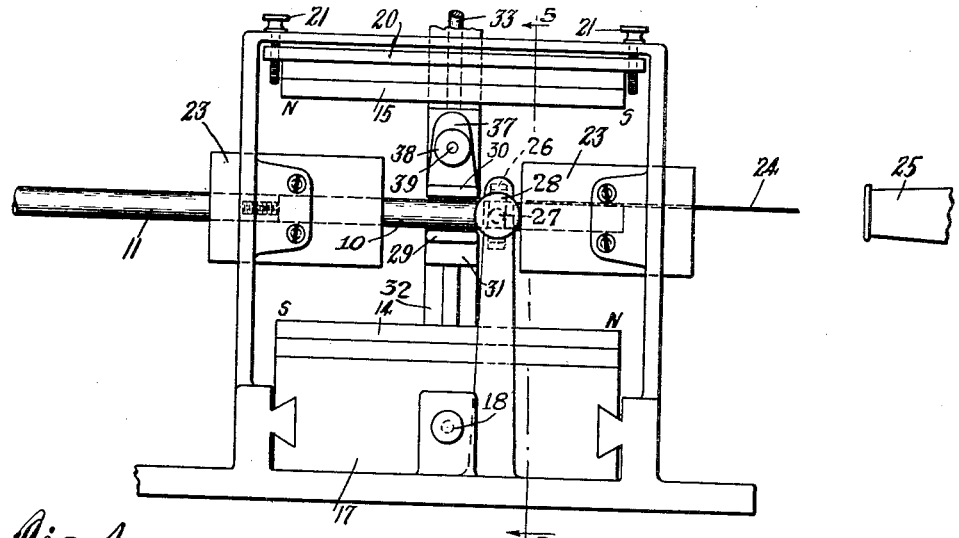
Figure 4 is a side elevation of a part of the apparatus shown in Figure 1, additional parts also being illustrated.
Figure 6:
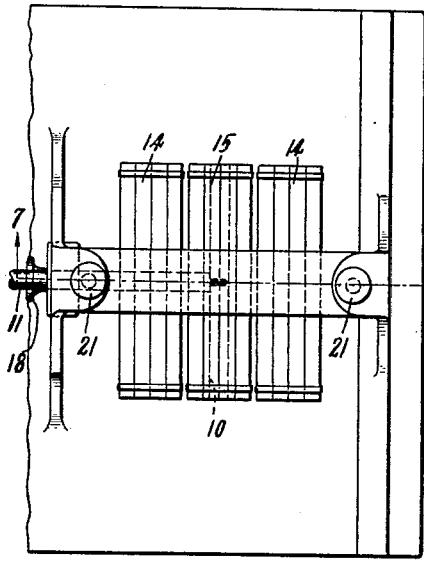
Figure 6 shows a plan view of a slightly modified form of apparatus.

Figures 6 and 7 show a slightly modified form of the apparatus which has certain advantages over the arrangement shown in Figures 1 and 2. Instead of projecting in the same direction with the arm 11, the magnet 10 may be mounted at right angles thereto, the stationary magnets 14 and 15 being arranged parallel with the floating magnet 10 as before. This manner of supporting the magnet 10 eliminates errors which might result from a change in the earth's magnetism. The vertical component of the magnetic field of the earth draws one pole of the magnet 10 downwardly and the other pole of the magnet upwardly with an equal force. Since in the arrangement shown in Figure 1, the leverage of the two poles is different, due to their different distances from the fulcrum 12, there is a resultant difference in torque about the fulcrum, and a change in the magnitude of the earth's magnetic pull would result in a change in the balance of the magnet 10. By mounting the magnet at right angles to the arm 11, the action of the earth's magnetic force on the poles and magnet 10 results merely in a slight twisting torque on the arm 11 which is carried by the action of the bearings carrying the fulcrum points 12. Such a twist in the arm 11 is too slight to affect the operation of the apparatus.

In addition to the stationary magnets 14 and 15, I may employ an auxiliary magnet 26. As shown in Figure 5, this magnet is preferably a small horseshoe magnet supported at a suitable distance from the magnet 10 by a rod 27 which can be rotated as by a knurled head 28. This auxiliary magnet can be used for very fine adjustment of the magnetic field about the floating magnet 10 and can also be employed in using the null method of measuring variations in forces acting on the magnet 10, the angular positions of the knurled head 28 being observable by suitable scale marks which may be calibrated in terms of displacement of the magnet 10.

For reasons to be set forth hereinafter, it is desirable that the motion of the magnet 10 be confined within relatively narrow limits. To this end, a pair of jaws 29, 30 may be provided. As shown in Figure 5, the lower jaw 29 may extend from a block 31 which is slidable up or down on a standard 32, the block being adjustable as by a screw 33 which is rotatable as by a knurled head 34. The upper jaw 30 may be pivoted as at 35 to a portion of the lower jaw 29, The upper jaw 30 as shown is held in adjusted position as by a pair of springs 36 which bear on opposite sides of an arm 37 extending upwardly from the jaw, the springs 36 abutting against collars 38 carried by a rod 39, a portion of which is threaded through the block 31. The rod 39 is rotatable as by a knurled head 40. By manipulation of the heads 34 and 40, the jaws 29 and 30 may be used to clamp the magnet 10 in any desired position or to permit it a limited range of motion in any desired portion of its extreme range between the upper and lower magnets.

In order to measure the very slight variations in forces for which the apparatus is intended, it is necessary that all disturbing influences of various kinds be eliminated. For example, when the instrument is used for purposes other than the investigation of external magnetic fields, it is preferably protected from stray fields by a suitable shield which may be similar to that illustrated in section in Figure 5. As therein shown, the shield comprises a double shell consisting of a pair of concentric cylinders 41, 42, these cylinders being preferably of permalloy or other magnetic material of relatively high permeability. The shells 41, 42 may be spaced as by a layer of non-metallic material, such as cloth, linoleum, copper, aluminum, or the like. This shield when in position should be spaced as far as convenient from the magnets 14 and 15. There should be no magnetic shield about the apparatus when it is used for investigating the earth's magnetic field or any other external magnetic fields. The shells are provided with end caps so that the entire standard supporting the magnets 14 and 15 is enclosed, small openings being left for the arm 11, and the adjusting rods for various magnets. The apparatus is also preferably maintained at a constant temperature and in an atmosphere of constant humidity, these conditions being obtained by methods well known in the art. In order to avoid errors from changes of buoyant effect of the atmosphere on the balanced portions of the appaartus due to variations in atmospheric density, the whole apparatus may be enclosed in an air-tight container, the interior of which is maintained at a constant pressure which may be approximately atmospheric or a low pressure if desired. Instead of enclosing the apparatus in an air-tight container, it may be preferred to neutralize the effect of changes of buoyancy of the atmosphere by balancing volumes of the moving portions of the apparatus on either side of the fulcrum 12 so that the summation of the elements of volume on each side of the fulcrum multiplied by their respective distances from the fulcrum will be equal. The size and location of the counterweight 22 (which may be hollow for this purpose) may be determined to secure this volume balance.

Figure 8:
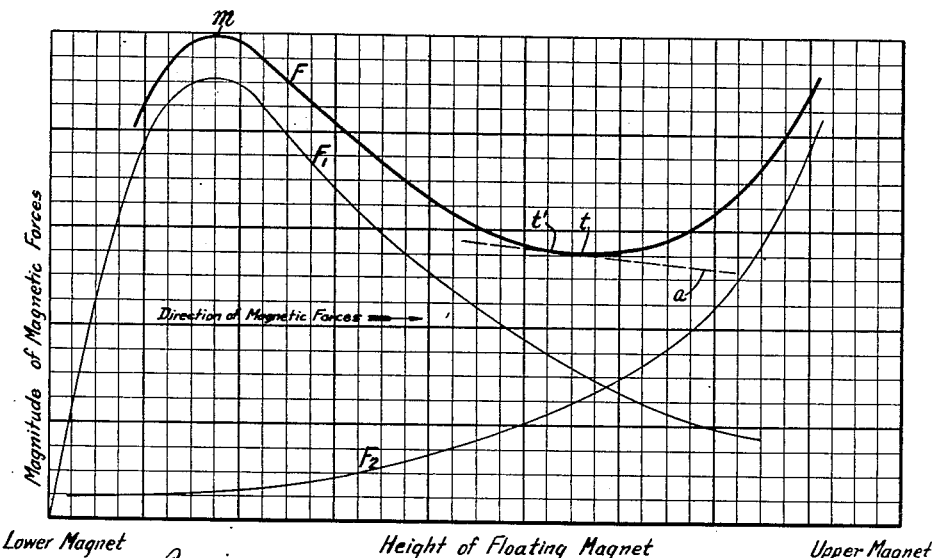
Figure 8 is a graph of lines of force illustrating the principle of the apparatus.

The principle of the operation of the apparatus may be understood from a study of the curves illustrated in Figure 8. The curve $F_1$ represents the variation of magnetic force due to the combined fields of the lower magnets 14 acting on the floating magnet 10 as it moves upwardly, the abscissæ of the curve representing the height of the magnet 10 in arbitrary units, the ordinates of the curve representing the magnitude of the resultant upward force acting on the magnet. The curve $F_2$ represents the attractive upward force of the magnet 15 acting on the floating magnet 10 as the latter moves vertically upward. It will be noted in connection with the curve $F_1$ that when the magnet 10 is at the same level with the magnets 14, there is no upward repelling force acting thereon. As the magnet 10 moves upwardly, the repelling force of the magnets 14 quickly reaches a maximum and then falls off according to the law of inverse squares. The attractive force of the magnet 15 increases as the magnet 10 rises, according to the same law of inverse squares. The curve F indicates the resultant of the forces of both the lower magnets 14 and the upper magnet 15. This resultant force reaches a maximum at the point $m$, then passes through a minimum at the point $t$. The points $m$ and $t$ on the curve F are of particular significance in that they mark the limiting points between stable and unstable equilibrium of the magnet 10. It will be observed that if the magnets 14, 15 are so adjusted that the magntic force between the maximum $m$ and the minimum $t$ is equal to the force of gravity, a point of equilibrium for the magnet 10 may be found where the horizontal line representing the magnitude of the force of gravity intersects the curve F. This point will be one of stable equilibrium since a displacement of the magnet 10 downwardly (that is, toward the left on the diagram) will result in an increase of magnetic force acting to raise it, due to the upward slope of the curve F toward the left. As the pull of gravity remains constant, this increase of upward magnetic pull accompanying a downward displacement of the magnet 10 tends to restore the magnet to its position of equilibrium. Likewise a displacement of the magnet upward (that is, to the right of the point of equilibrium on the diagram) will result in a smaller magnetic force acting to raise the magnet. Hence gravity will tend to restore the magnet to its position of equilibrium. It is obvious that any horizontal line cutting the curve F between the points $m$ and $t$ will also cut the curve in two other points, at both of which points the curve slopes upwardly to the right. These points will be points of unstable equilibrium since any displacement of the magnet either up or down will result in an unbalancing of the opposed forces in a way to continue the motion of displacement of the magnet. In the operation of the apparatus, it is therefore important to locate the jaws 29, 30 in such a way as to limit the movement of the magnet 10 to a short range located between the points $m$ and $t$.

Since the curve F represents the resultant of the lifting forces of the magnets 14 and 15 on the floating magnet 10, it follows that an adjustment of the positions of the magnets 14 and 15 will result in a displacement of the curve F with or without a slight modification of its curvature. The general shape of the curve, however, will not be changed. For example, by increasing the spacing between the magnets 14 and 15, the resultant magnetic force on the magnet 10 will in general be decreased throughout its range of motion so that the curve F will thus be lowered on the chart. Conversely, if the magnets 14 and 15 be brought closer together, the curve F will be raised on the chart. Since the gravitational pull on the magnet 10 would appear as a horizontal line on the chart, it is thus obvious that the curve F may be shifted by manipulation of the magnets 14 and 15 so that the curve will intersect the horizontal gravity line at the points $m$ or $t$ or in any intermediate point.

The sensitivity of the apparatus may be defined as follows:—

$$\text{Sensitivity} = \frac{\text{displacement of floating magnet}}{\text{change of gravitational force}}$$

Referring to the diagram, it is apparent that since a displacement of the floating magnet is measured by the change in the abscissa representing the position, and the change of gravitational force is represented by a change in the ordinate representing the magnitude of the gravitational force, the sensitivity is represented by the cotangent of the inclination of the curve at the point of equilibrium. Taking a limiting case as an example, the inclination of the curve at the points $m$ or $t$ is zero, hence at these points the sensitivity is infinite. It is significant that at these points, the equilibrium changes from stable to unstable so that if the point of equilibrium is, for example, at $t$, a downward displacement of the magnet will soon be opposed by an increase of magnetic lifting force. If the magnet when at equilibrium at the point $t$ is displaced upwardly, the increase of magnetic force continues its upward movement. It is desirable for practical operation coupled with high sensitivity to select a point of equilibrium on the curve which is fairly close to the point $t$ and is between the points $t$ and $m$. If, for example, the curve F is so adjusted that the gravity line intersects it at a point $t'$ near to the point $t$ and between the points $t$ and $m$, the sensitivity of the apparatus will be represented by the cotangent of the inclination of the line $a$ which is tangent to the curve at the point $t'$. It may be noted here that the relative flatness of the curve at the point $t$ is advantageous for operation of the apparatus in comparison with the relative sharpness of the curve at the point $m$ since for a given sensitivity the point $t'$ is spaced at a greater distance from the point $t$ than it would be from the point $m$, thus giving a greater range of motion to the magnet 10. Another advantage of the relative flatness of the curve arises from the fact that the sensitivity changes less rapidly and consequently a displacement of the magnet 10 is more nearly proportional to the change of force which causes it. A further advantage to be gained from operating near the point $t$ rather than the point $m$ arises from the fact that at the point $t$ the magnetic forces tending to demagnetize the magnet 10 are much smaller than when the magnet is near the point $m$, since in the latter event, the magnet 10 is floated almost entirely by the repelling force of the magnets 14, the fields of which oppose the field of the magnet 10 and tend to demagnetize the magnet, whereas at the point $t$ the repelling and demagnetizing force of the magnets 14 which affects the magnet 10 is far less than at the point $m$. Since the gravity-opposing force on the magnet 10 due to the fields of the magnets 14 is only a component of the total demagnetizing force of repulsion of these magnets, and since this total force becomes increasingly large compared with its vertical component as the magnet 10 is balanced at lower points nearer to the level of the magnets 14 (as when the pull of the magnet 15 is decreased), it is apparent that the difference in demagnetizing force at $m$ and $t$ may be of considerable practical importance.

In using the apparatus for the detection of changes in the acceleration of gravity, the magnets 14 and 15 may be so adjusted that the curve F will cut the horizontal line representing the gravitational pull at a point such as $t'$. The magnet 10 is thereupon located at a height corresponding to the abscissa of the point $t'$ and the jaws 29 and 30 are adjusted to allow a slight displacement of the magnet 10 in either direction from its position of equilibrium at the point $t'$. Keeping the magnetic field constant and other conditions surrounding the apparatus unchanged, the apparatus may be removed to another locality and the position of the magnet 10 observed. If the gravitational pull has slightly increased, it is obvious that the intersection point $t'$ will have moved toward the left on the curve F. Hence the magnet 10 in following the point of equilibrium will be displaced downwardly. Conversely, a slight decrease in the gravitational pull will result in an upward displacement of the magnet 10. The auxiliary magnet 26 may then be adjusted to return the magnet 10 to its initial position, the angle of rotation of the magnet 26 being available as a measure of the change of gravitional pull by the proper calibration of scale marks on the head 28.

Having thus described certain embodiments of my invention, it should be evident to those skilled in the art that various changes and modifications might be made therein without departing from its spirit or scope as defined by the appended claims.

I claim:—

1. Apparatus of the class described, comprising a magnet, means for mounting the same so that it will be movable by gravity, means for establishing a magnetic field of force about said magnet and cooperating with the motion-producing component of gravity to maintain said magnet in a position of stable equilibrium, and separate magnetic means movable to modify said field of force to restore said magnet when it has been displaced by a variation of any of the forces acting on it.

2. Apparatus of the class described, comprising a member, means for mounting the same so that it will be movable by gravity, means for establishing about said member a field of force to which said member is responsive and which cooperates with the motion-producing component of gravity to maintain said member in a position of stable equilibrium, means for controlling the sensitivity of the apparatus, said controlling means comprising means for altering said field of force to adjust the stability of said equilibrium near to the limit of instability, and means for positively retaining the member within the range of a restoring resultant of the forces.

3. Apparatus of the class described, comprising a member of magnetic material, means whereby said member is supported for substantially free vertical motion, means for counteracting the gravitational pull on said member comprising a plurality of magnets disposed about said member and spaced therefrom, means for adjusting said magnets so that the equilibrium position of the member is stable, but as near as desired to the limit of stable equilibrium.

4. In apparatus of the class described, a floating magnet, means whereby said magnet is supported for substantially free vertical motion, a pair of spaced stationary magnets positioned below said floating magnet, the poles of the magnets being so arranged that the floating magnet is repelled from the magnets beneath it, an upper stationary magnet above said floating magnet having polarity to attract said floating magnet upwardly, means for adjusting the position of certain of said stationary magnets to control the resultant field of force about the floating magnet, and means for limiting the vertical displacement of the floating magnet.

5. Apparatus of the class described, comprising a floating horizontal magnet, means whereby said magnet is supported for substantially free vertical motion, a pair of spaced adjustable stationary magnets below and on either side of the floating magnet, said stationary magnets being substantially parallel to the floating magnet and having their like poles opposite the corresponding like poles of the floating magnet whereby repelling magnetic force is exerted on the latter, an upper adjustable stationary magnet above and substantially parallel to the floating magnet, said upper magnet having its poles reversed with reference to the poles of the floating magnet whereby the latter is attracted by the upper magnet, and an auxiliary magnet spaced from all the other said magnets with its magnetic field modifying the field of said other magnets, said auxiliary magnet being movable to alter the result of the magnetic force acting on said floating magnet.

6. Apparatus of the class described, comprising a substantially horizontal floating magnet, a lever arm carrying said magnet at one end thereof, said arm being pivotally mounted for oscillation in a vertical plane, a pair of magnets adjustably fixed below, parallel to, and on either side of said floating magnet, the poles of the floating magnet being opposite like poles of the fixed magnets, an upper magnet adjustably fixed above and parallel to said floating magnet, said upper magnet having its poles reversed with reference to those of the floating magnet, an auxiliary magnet spaced from all the other said magnets and movable to modify the field of magnetic force about the floating magnet, means for adjustably limiting the free motion of the floating magnet, means for damping such free motion, and means for magnifying small motions of the floating magnet for observation.

7. The method of detecting variations in the acceleration of gravity, which comprises supporting a magnet for substantially free motion under the influence of gravity, establishing a constant magnetic field of force about said magnet to counterbalance the influence of gravity, locating the magnet at a point of stable equilibrium in said field of force, and observing displacements of said magnet arising from changes in gravitational pull thereon.

8. The method of detecting variations in the acceleration of gravity, which comprises supporting a magnet for substantially free motion in a substantially vertical plane under the influence of gravity, establishing a constant magnetic field of force about said magnet to counterbalance the influence of gravity, locating the magnet at a point of stable equilibrium in said field of force, and observing displacements of said magnet arising from changes in gravitational pull thereon.

9. The method of detecting variations in the acceleration of gravity, which comprises supporting a magnet for substantially free vertical motion, establishing a magnetic field of force about said magnet characterized by an upward component which passes through a minimum value as the magnet moves vertically through its extreme range of motion, adjusting said field of force so that said minimum value is slightly less than the pull of gravity, balancing the magnet at a point just below the point of minimum value, and observing displacements of said magnet from its balanced position.

In testimony whereof I have affixed my signature.

BETHEL J. BABBITT.